United States Patent Office 2,933,765
Patented Apr. 26, 1960

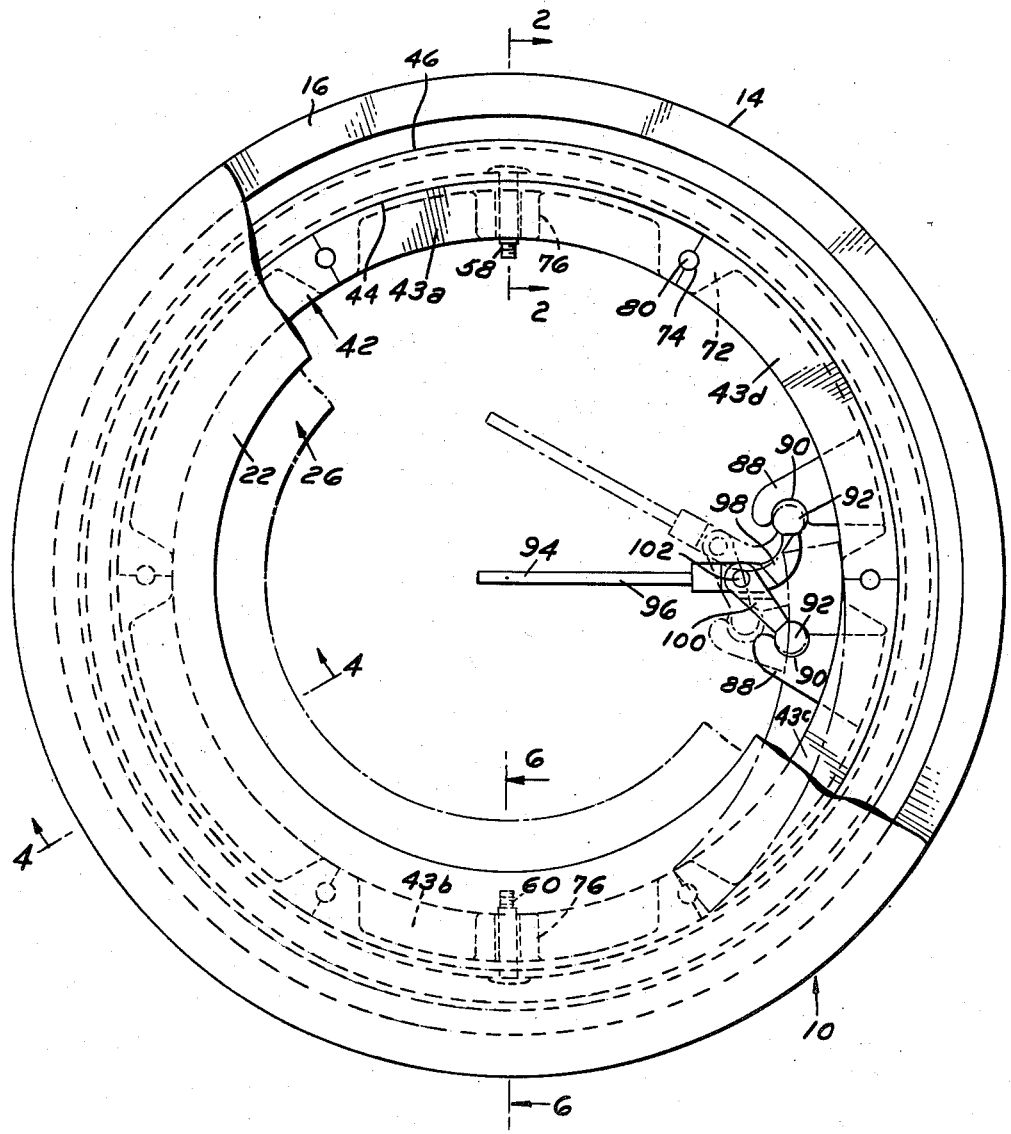

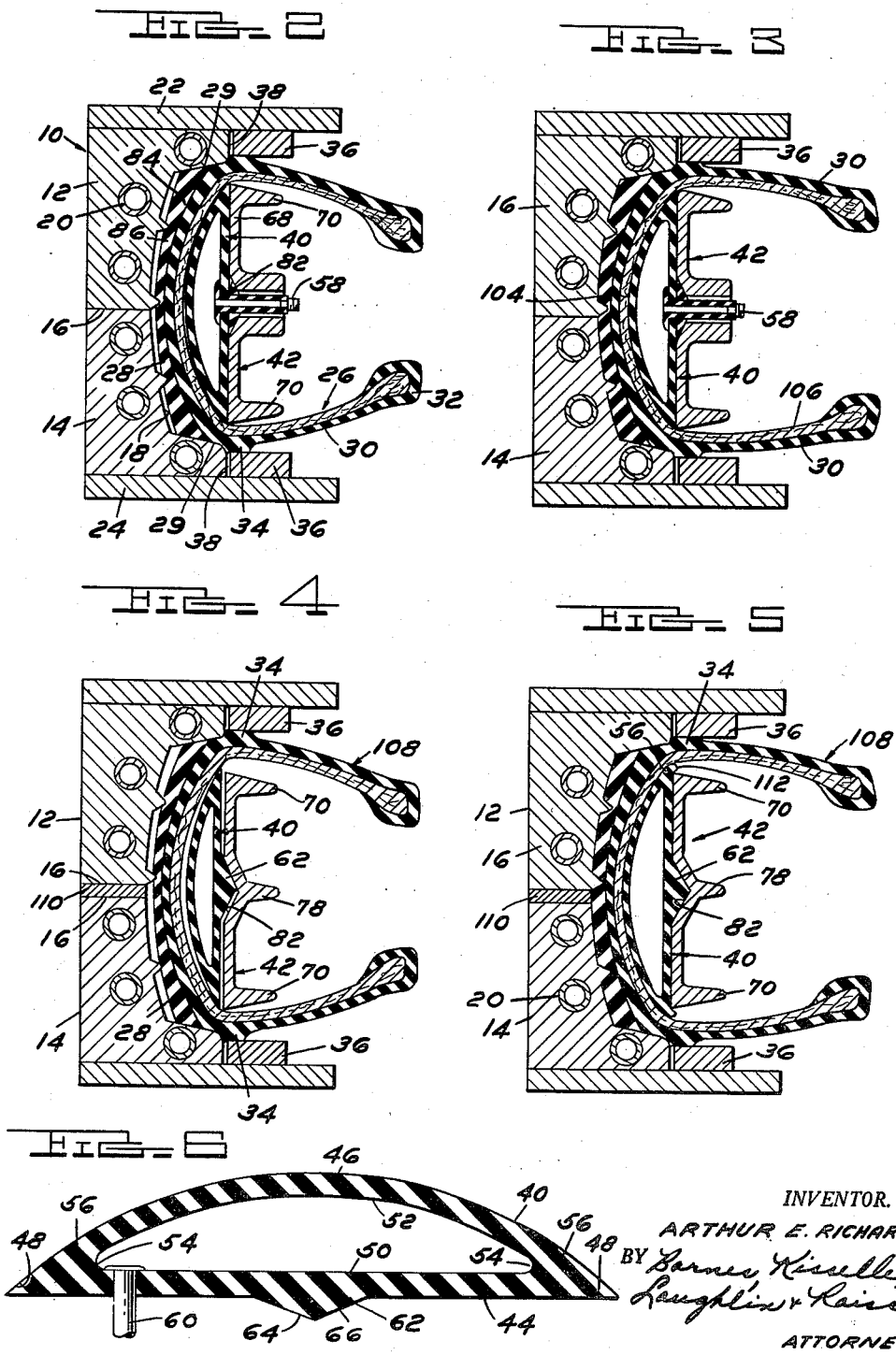

2,933,765

APPARATUS FOR RECAPPING TIRES

Arthur E. Richardson, Detroit, Mich., assignor of fifty percent to Harry B. Park, and fifty percent to Moe Saslove, both of Detroit, Mich.

Substituted for abandoned application Serial No. 582,964, May 7, 1956. This application December 22, 1958, Serial No. 782,279

7 Claims. (Cl. 18—45)

This invention relates to a method and apparatus for recapping pneumatic tires of both the tubeless type and those used with inner tubes.

The recapping of pneumatic tires is a very important operation with respect to the ultimate life of the tire. If properly recapped, a tire may safely be subjected to numerous recapping operations, as many as 8 or 10 in the case of large truck tires; but if improperly recapped, a tire may fail in a relatively short time after its initial recapping. In the process of recapping, a tire is necessarily subjected to heat and pressure. The application of heat sufficient to effect vulcanizing is in general detrimental to portions of the tire that are not being recapped; and at the same time, subjecting the tire to high internal pressure when the tire is heated to vulcanizing temperatures is also detrimental.

The present invention has for its object the provision of an apparatus and method for recapping tires in which the heat and pressure detrimental to the tire is reduced to a minimum in the recapping operation.

More specifically, the invention has to do with a recapping method and apparatus designed to restrict the application of heat and pressure to substantially only those portions of the tire on which the new tread is being applied; that is, substantially only the radially outermost portions of the tire. Thus, in accordance with the present invention, in the process of recapping, only the tread portion of the tire is heated and stretched. The side wall of the tire and the tire core within the side wall is substantially unaffected by the recapping operation when performed in accordance with the method and apparatus of the present invention.

Another object of the invention resides in the provision of a recapping apparatus for tires that is designed to produce consistently sound recapped tires.

A further object of the invention is to provide a recapping apparatus which is light in weight, easy to manipulate manually and economical in cost.

A further object of the present invention is to provide a tire recapping apparatus that is constructed such that an assembly designed for a particular size tire is adapted to accommodate and successfully recap tires that vary substantially from said predetermined tire size.

A still further object of the invention resides in the provision of a rim and pressure core for recapping tires that are designed to automatically align themselves properly within the tire to be recapped.

A still further object of the invention resides in the provision of a fluid pressure core, or bag, as it is commonly referred to, of improved construction that is designed to withstand a substantially greater number of recapping operations than such cores or bags of conventional design.

In the drawings:

Fig. 1 is a plan view of a recapping apparatus embodying the present invention, parts being broken away to better illustrate the relationship between the several members.

Fig. 2 is a sectional view taken generally along the lines 2—2 in Fig. 1 and showing the manner in which the various members of the apparatus of this invention are assembled, the parts being shown in their relative position prior to the inflation of the bag.

Fig. 3 is a view corresponding to Fig. 2 and showing the bag in the inflated condition.

Fig. 4 is a sectional view along the lines 4—4 in Fig. 1 showing the relative positions of the parts prior to inflation of the bag.

Fig. 5 is a view corresponding to Fig. 4 and showing the bag in the inflated condition.

Fig. 6 is a sectional view of the bag alone as viewed along the lines 6—6 of Fig. 1.

Referring to the drawings, numeral 10 generally designates a recapping mold which in most respects is generally conventional. Mold 10 is of annular shape and includes an upper section 12 and a lower section 14 having parting faces at 16. The inner faces of sections 12 and 14 have machined or otherwise formed thereon the tire tread configuration as at 18. Means such as steam conduits 20 are provided within sections 12 and 14 for heating the inner tread forming face 18 of these mold sections. The mold sections 12 and 14 are retained between top and bottom annular plates 22 and 24, respectively.

The tire being recapped is designated 26. Tire 26 is of conventional construction and includes a tread portion 28 extending around the radially outer face of the tire and provided with shoulders 29 at each side thereof and side walls 30 provided with beads 32. The junction between shoulder 29 of tread portion 28 and the side wall 30 is generally defined by buffing bars 34 which form annular ridges at each side of the tire. To each of the plates 22 and 24, there is secured an annular ring 36 positioned to engage the buffing bars 34 on the tire. It will be observed that rings 36 are insulated from the heated portions 12 and 14 of the mold by the annular air gaps 38. In the recapping operation, there is arranged within tire 26 a core or bag 40 and a rim 42.

The bag 40 is shown more clearly in Fig. 6. The bag is formed of rubber preferably by an extrusion process and includes a generally flat inner cylindrical wall 44 and an outer curved wall 46. Walls 44 and 46 intersect at their outer faces in relative sharp corner portions 48. The inner faces of these walls designated 50 and 52, respectively, intersect in rounded corner portions 54. With this arrangement, it will be observed that although the bag is formed entirely of rubber, the outer edge portions 56 of the bag are relatively thick and comprise sections of solid rubber. At preferably diametrically opposite points, bag 40 is provided with valve stems 58 and 60. Valve stem 58 comprises an inlet fitting and valve stem 60 provides a bleed fitting when the bag is used with steam. When the bag is used with air, one of these two valve stems may be plugged. The axial central portion of wall 44 is fashioned with an annular bead 62 which projects radially inwardly. In the embodiment shown, bead 62 is provided with angularly inclined faces 64 and 66.

Rim 42 comprises a series of arcuate sections 43 (Fig. 1), each section having an arcuate peripheral wall 68 and radially inwardly projecting side walls 70 around the opposite edges of the peripheral wall 68. At opposite ends of each rim section, there are provided abutments 72 fashioned with semi-cylindrical sockets 74. Intermediate the ends, two of the rim sections, 43a and 43b, are fashioned with apertured bosses 76 for accommodating valve stems 58 and 60. Intermediate the side walls 70, each arcuate section of the rim is provided with an annular inwardly projecting reinforcing rib 78. One end of each arcuate section of the rim is provided with a rivet or pin 80 in sockets 74 so that the arcuate sections may be assembled end-to-end to form a ring, the peripheral wall 68 of the ring generally forming a cylinder. The radially outer face of wall 68 is fashioned with a central groove 82. In the embodiment illustrated, groove 82 is of a V-shape in cross section to correspond with the cross sectional shape of annular bead 62 on bag 40.

Referring now to Fig. 2, when it is desired to recap a tire, the remaining tread on the tire is buffed down generally to the surface indicated at 84 and a layer of rubber 86 which will form the new tread on the tire is cemented to this buffed surface. Thereafter, with the mold 10 in the open condition, that is, sections 12 and 14 separated, the tire is positioned within the lower section 14 of the mold. The mold is then closed and the tire assumes the position shown in Fig. 2. The tire is confined axially by the annular rings 36 abutting against the buffing bars 34 on the tire. Bag 40 is inserted within the tire; and thereafter, the sections of rim 42 are arranged within the tire in end-to-end relation. A pair of the rim sections, 43c and 43d, are provided with lugs 88 having sockets 90 for receiving the cylindrical end portions 92 of a rim assembly tool 94. Tool 94 includes a handle 96 having an arcuate end portion 98. A link 100 is pivotally connected with the portion 98 as at 102. The cylindrical members 92 are fashioned at the free ends of arcuate portion 98 and link 100. When the rim is initially assembled within the tire, one of the end sections will overlap the adjacent end section shown in broken lines in Fig. 1. The cylindrical members 92 of the tool are engaged in the respective sockets 90 of the lugs 88 and the handle 96 is then pivoted from the broken to the solid line position to circumferentially expand the rim sections and simultaneously shift the overlapping rim section into alignment with the adjacent end section of the rim as illustrated. It will be appreciated, of course, that the bag 40 and rim 42 may be arranged within the tire before the tire is inserted in the mold.

In Fig. 2, the tire 26, bag 40, rim 42 and mold 10 are shown in their relative positions before bag 40 is inflated. The diameter of rim 42 corresponds generally with the diameter of the tire adjacent the buffing bars 34. Thus, the bag 40 is located within that portion of the tire extending generally between the tread and the buffing bars 34. Bag 40 in section defines a segment of a circle but is substantially less than a semi-circle. At the same time, it will be observed that the heating sections 12 and 14 of mold 10 contact the tread portion of the tire down to adjacent the buffing bars 34. The tire as illustrated in Fig. 2 is in a generally relaxed condition with the side walls 30 extending radially inwardly towards one another. When the bag 40 is inflated (Fig. 3) such as by the introduction of steam or air under pressure through the valve stem 58, the tread portion of the tire is expanded radially outwardly into the tread configuration 18 of the mold. This causes the side walls 30 to be straightened slightly as illustrated. Under the influence of heat, the tire is vulcanized in this condition. In this condition, the tire assumes more nearly its shape when mounted on a rim and inflated. Thus, the tire is cured in the shape it assumes in use. Experience has shown that tires capped in this manner out last tires which are cured with the side walls in a cramped or bulged unnatural position. It will be observed that with the arrangement described, the only portion of the tire that is subjected to heat and pressure is substantially the portion to which the tread is being applied. In the arrangement shown, this comprises the radially outermost portions of the tire extending between the buffing bars 34. In view of the fact that the annular rings 36 are spaced from the heated sections of the mold, very little heat is conducted to the side walls of the tire. Thus, the pressure is applied substantially in a radially outward direction against the tread of the tire and it utilized substantially exclusively for expanding the tread radially outwardly against the mold. This stretches the tread portion of the tire and takes all of the stretch out of the cord 104 in the tread portion of the tire without affecting the cord 106 in the side walls 30 of the tire. In this connection, it will be noted that since bag 40 is formed entirely of rubber, it is free to expand readily for pushing the tread of the tire outwardly against the mold. This would not be the case if the bag 40 were reinforced with the cord.

In view of the fact that this arrangement confines the application of heat to only those portions of the tire where it is required in order to effect recapping, applicant has found that he is able to use a heated mold such as 10 and to employ steam under pressure in the bag 40. Thus, with this arrangement, the heat is applied from both the inside and the outside of the tire. This prevents overcuring of the outer portion of the tire, as is often the case where an air bag is used, and at the same time enables curing the tread and any repairs inside the casing within the area contacted by the bag in a single operation. Although a conventional sectional mold is illustrated in the drawings, it will be appreciated that the rim and bag of this invention is equally adaptable for use with the conventional band-type mold; and in either event, since the pressure is applied radially substantially only against the tread portion of the tire, the need for pressure plates conventionally employed at each side of the tire within the mold is eliminated.

The arrangement illustrated in Figs. 4 and 5 generally corresponds to the showing in Figs. 2 and 3 and further illustrates the versatility of the bag and rim of this invention. In Figs. 4 and 5, the tire 108 there illustrated is slightly oversize as compared with the tire 26 shown in Figs. 2 and 3, even though these tires may originally have been manufactured to the same size. In the case of an oversized tire, such as shown at 108, a spacer or insert 110 is arranged between the parting faces 16 of the mold sections 12 and 14. However, even though the tire 108 is substantially wider than the bag 40 or rim 42, this same bag and rim may be utilized for recapping tire 108. The bag and rim are arranged within the tire in the manner described with reference to Fig. 2; but since they are narrower than the inside axial dimension of the tire in the region of the buffing bars 34, the bag and rim will naturally tend to drop to the lower side of the tire as illustrated. However, when the bag 40 is inflated, it will naturally tend to center itself in the tire; and since the bead 62 of the bag is engaged with the groove 82, the rim will automatically be drawn upwardly into center relation with respect to the tire. Thus, the bead 62 and groove 82 form an interconnection between the bag and rim that insures proper centering of the rim in the tire. Obviously, these means can take forms other than the bead and groove shown. Since the bag 40 is free to expand, the outer edge portions 56 of the bag bulges radially inwardly around the outer edges of rim 42 as at 112. However, since these outer edge portions 56 are formed of rubber and not reinforced by cord, for example, they stretch quite readily. At the same time, the rubber at these edge portions is of a relatively heavy section; and there is no tendency for the bag to blow out or for the edges of the rim to cut through the bag. Likewise, since the bag stretches readily, it contracts readily when the pressure is removed so that it will fit snugly in a subsequent tire to be recapped that may be of relatively less width. This would not be the case if the bag 40 and especially the edge portions 56 thereof were reinforced with cord. The annular bead 62, as pointed out above, cooperates with the groove 82 in the rim to center the rim in the tire. In addition, bead 62 forms a substantial reinforcement for the bag that prevents it from collapsing when inserted in the tire. It will be appreciated that these bags are used continuously and will be relatively hot when used with steam continually from one operation to the next. Thus, bead 62 enhances the self-supporting qualities of the hot bag and enables it to be inserted more readily in a tire.

It will be appreciated that at the present time, substantially all vehicle tires are formed with buffing bars such as shown at 34. To those skilled in this art, the tread portion of a tire is considered as that portion extending around the outside of the tire between the buffing bars. The term "tread portion" as used in the description and the appended claims is intended to define this portion of a tire.

It will be observed that in use for retreading a tread worn tire, using a tread strip applied to the worn tread outside the tire and between it and the mold, the machine is substantially horizontally disposed. Thus the mold, the bag, and the bag supporting or anvil rim are centered in substantially a horizontal plane, the same plane for all the parts.

Further the engaged faces of the bag and rim have wedging formations, shown as a V-shaped rib on the bag and a V-shaped groove on the rim. These formations engage, loosely at first, to center the rim and bag in the tire. Then, when the bag is inflated, these formations wedge each other firmly for progressively wedging and centering the rim in a final centered position, preventing slipping, turning or twisting of the rim.

The inflating valve stem is in the thickest part of the bag inner surface, namely the central rib. This decreases and even possibly eliminates the chance of valve failure.

The rim is of less axial length than the inflated bag and its edges are free of the inflated tire sidewalls and the pressure against the side walls comes from the bag. Hence the rim does not engage the tire side walls, possibly to cut them. Hence side wall cutting due to the rim is eliminated.

The rim and bag have their mating faces flat except for the rib and groove. This eliminates gaps and pinching of the parts on bag inflation.

It will also be observed that the major portions of the side walls especially the bead parts or edges of the side walls, are free of the rim when the bag is inflated. This is because the rim diameter is considerably greater than that of the tire bead diameter, which spaces the beads well within the rim, and because the rim length axially is less than the wall to wall dimension of the tire when the bag is inflated. Because the beads are free of the rim, it becomes possible to retread tubeless as well as tube type tires.

This application is a substitute for my prior application filed May 7, 1956, Serial No. 582,964, allowed July 8, 1958, now abandoned.

Now having described the apparatus disclosed I refer to the claims which follow.

I claim:

1. In a vulcanizing apparatus for pneumatic tire casings including a mold adapted to enclose the tread portion of a tire, an annular inflatable and expansible bag adapted to be positioned within the tire and an annular bag supporting rim of rigid material having an axial length less than the inside diameter of the inflated tire casing, and wherein an inwardly directed, axially extending annular flange on the inflatable bag mates with an outwardly directed, axially extending face of the rim, that improvement which comprises a radially extending V-shaped groove in said rim face and a mating radially extending V-shaped solid reenforcing rib on said bag, said bag being of sufficient thickness to maintain its shape upon inflation and being pre-shaped to mate with the inside of the tire casing on its inflation to present said rib in a predetermined position relative to the tire casing and said groove in said rim being positioned to engage said rib loosely when the bag is uninflated and when the bag is inflated, to hold said rim forcibly centered in said tire by mating engagement with said rib with the opposite edges of the bag extending axially beyond the opposite edges of the rim, whereby inflation of the bag gradually and progressively forces said rim and groove into said mating engagement and said rim to said centered position.

2. In an apparatus for treading a tire having a tread wall and two side walls by a tread strip applied to the tread wall; said apparatus comprising a mold adapted to surround and enclose the tread wall and strip; the combination of an annular inflatable and expansible bag dimensioned to be positioned within the tire against the inside of its tread wall and between its side walls; and an annular bag-supporting anvil rim of rigid material whose outside face is disposed against the inside face of the bag; these engaged faces having annular mutually meshing wedging formations which mutually cooperate, when the parts are positioned for the treading operation, in a manner whereby the bag and the anvil rim adjust mutually and axially to center themeselves in the tire before and during inflation of the bag; said bag being of sufficient thickness to maintain its shape upon inflation; said bag also being preshaped to mate with the inside of the tire on its inflation to present its wedging formation in a predetermined position relative to the tire; the wedging formations being positioned to engage each other loosely when the bag is uninflated and, when the bag is inflated, the formations center said anvil rim forcibly in said tire by the mating-wedging engagement of said formations, whereby inflation of the bag gradually and progresssively wedges and forces said formations into firm mating engagement and said rim to a final and accurately centered position; the wedging formations cooperating on bag inflation to inhibit slipping and twisting and turning of the anvil rim the engaged faces of the bag and anvil rim being flat except for said formations; the wedging formations comprising a central V-shaped annular rib on the inside of the bag and a central V-shape annular groove on the outside of the anvil rim.

3. In an apparatus according to claim 2; and said bag having an inflating valve stem centered and reinforced therein by being positioned in said bag rib.

4. For use in an apparatus for treading a tire having a tread wall and two side walls by a tread strip applied to the tread wall, with said apparatus comprising a mold adapted to surround and enclose the tread wall and strip; and an annular anvil rim of rigid material whose outside face is formed with a central annular wedging V-shaped groove and is otherwise flat; said rim having an axial length less than the inside axial length of the inflated tire, i.e., the distance measured from the inside of one side wall to the inside of the other side wall; said rim being considerably larger in diameter than the edge-bead diameter of the tire whereby the edge beads are well within and float free of the rim during the treading operation; an annular inflatable and expansible bag dimensioned to be positioned within the tire against the inside of its tread wall and between its side walls; said bag having a central annular V-shaped wedging rib on its inside surface which is otherwise flat; said bag being of sufficient thickness to maintain its shape upon inflation; said bag also being preshaped to mate with the inside of the tire on its inflation to present its wedging rib in a predetermined position relative to the tire; said bag rib being positioned to seat in said rim groove loosely when the bag is uninflated; and, when the bag is inflated, to center the rim forcibly in said tire by the wedging coaction of the bag rib and rim groove whereby inflation of the bag gradually and progressively wedges and forces the rib into firm mating engagement with the groove and said rim to a final and accurately centered position to inhibit slipping and twisting and turning of said rim.

5. For use in an apparatus according to claim 4; and said bag having an inflating valve stem centered and reinforced therein by being positioned in said bag rib.

6. Tire vulcanizing apparatus including an annular rim having a flat outer surface formed with an annular central radial extending V groove therein; and an annular inflatable tube surrounding the rim and seated on it and having a flat inner surface seated on the flat outer surface of the rim and formed with an annular central inwardly projecting radial extending V rib mating with said groove; the rib and groove cooperating by relative wedging action to interlock the rim and tube against relative shifting axially.

7. A construction according to claim 6 wherein the tube has an inflating valve stem centered and reinforced therein by being positioned in said tube rib.

References Cited in the file of this patent

UNITED STATES PATENTS

| | | |
|---|---|---|
| 1,388,747 | Ofensend | Aug. 23, 1921 |
| 1,670,446 | Gammeter | May 22, 1928 |
| 1,779,385 | Wirgman et al. | Oct. 21, 1930 |
| 1,799,933 | Snyder | Apr. 7, 1931 |